Oct. 23, 1962  P. C. TREXLER  3,059,831
CONNECTION BETWEEN TWO SEALED CHAMBERS AND
METHOD OF MAKING THE SAME
Filed Nov. 28, 1958  3 Sheets-Sheet 1

INVENTOR.
PHILIP C. TREXLER
BY
Eugene C. Knoblock
ATTORNEY

Oct. 23, 1962
P. C. TREXLER
3,059,831
CONNECTION BETWEEN TWO SEALED CHAMBERS AND
METHOD OF MAKING THE SAME
Filed Nov. 28, 1958
3 Sheets-Sheet 2
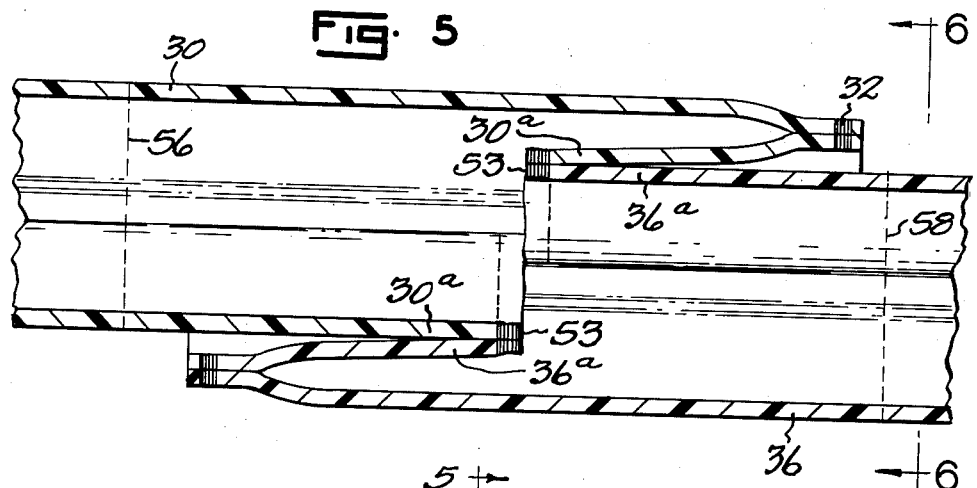
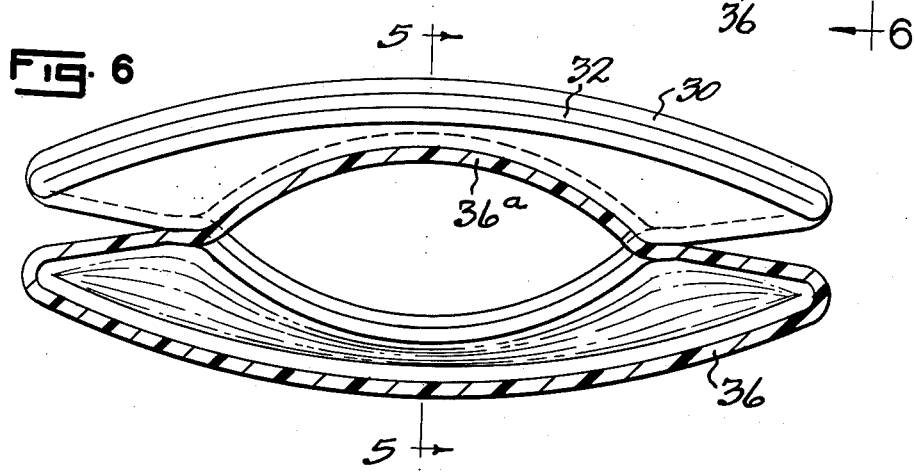
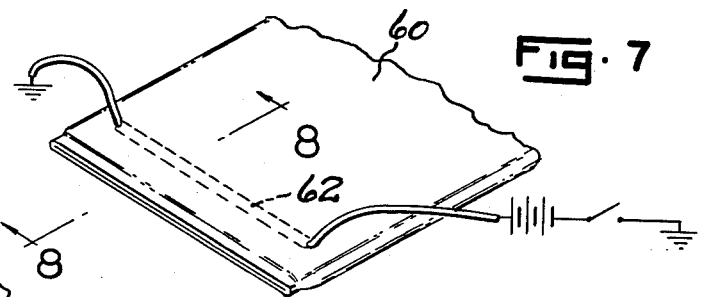
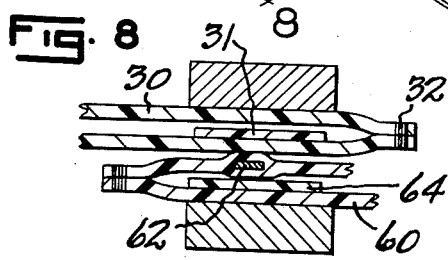
INVENTOR.
PHILIP C. TREXLER.
BY
Eugene C. Knoblock
ATTORNEY Oct. 23, 1962  P. C. TREXLER  3,059,831
CONNECTION BETWEEN TWO SEALED CHAMBERS AND
METHOD OF MAKING THE SAME
Filed Nov. 28, 1958  3 Sheets-Sheet 3
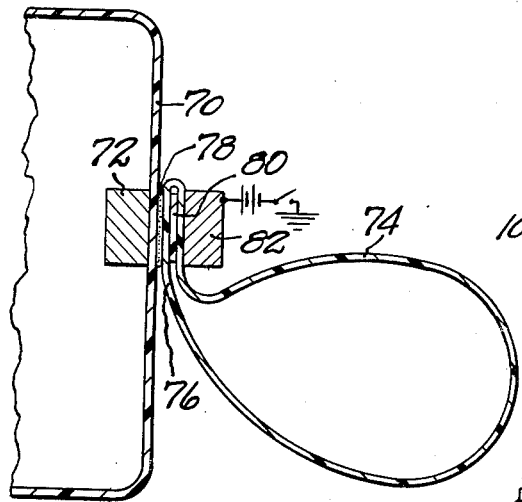
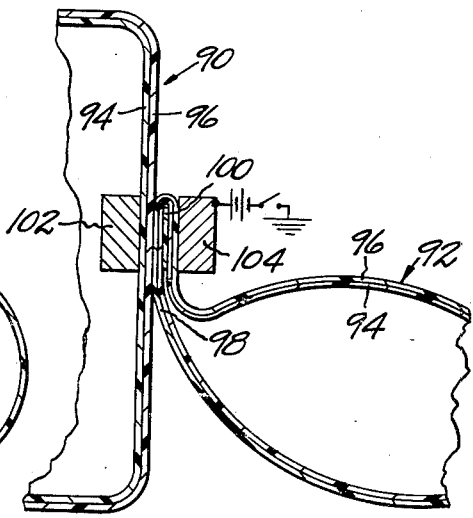
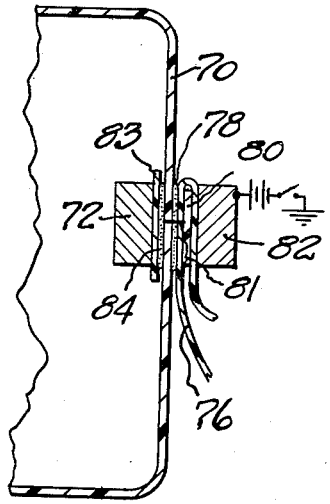
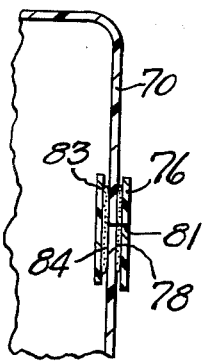
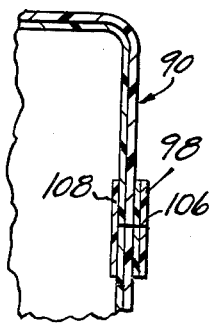
INVENTOR.
PHILIP C. TREXLER.
BY
Eugene C. Knoblock
ATTORNEY United States Patent Office 3,059,831
Patented Oct. 23, 1962

3,059,831
CONNECTION BETWEEN TWO SEALED CHAMBERS AND METHOD OF MAKING THE SAME
Philip C. Trexler, Niles, Mich., assignor to University of Notre Dame du Lac, Notre Dame, Ind., a corporation of Indiana
Filed Nov. 28, 1958, Ser. No. 776,966
10 Claims. (Cl. 229—56)

This invention relates to improvements in connections between two sealed chambers, and methods of making the same, and more particularly to connections between an isolator for containing biological and other specimens within a controlled environment and a container therein and containing material to be introduced into the isolator or adapted to receive material to be discharged from an isolator.

Isolators for maintaining materials with a controlled environment have been found to be useful in the biological, radiological and chemical fields. Such isolators basically constitute an enclosure effective to confine contamination while experiments or tests involving contamination of specimens are being made, or to exclude contamination from a space within which tests and experiments are conducted upon specimens. Examples of isolators useful for this purpose are shown in the J. A. Reyniers Patent No. 2,244,082, dated June 3, 1941; my prior Patent No. 2,705,489, dated April 5, 1955; and my co-pending patent applications Ser. No. 524,999, filed July 28, 1955, for Contamination Control Apparatus and Method, now Patent No. 3,031,007; and Ser No. 656,396, filed May 1, 1957, for Isolating Device.

In using the early isolator constructions, wherein the constituent units are formed of metal, it is necessary to provide means for connecting together two units or chamber-defining members for the purpose of transferring contents of one to the other without breaking the controlled environment. This is usually accomplished by effecting a sealed connection between a transfer container and one isolator around a releasable enclosure in the isolator and then effecting a sealed connection between the transfer container and the other isolator unit at a point around a releasable closure in said other unit. The connections of the transfer container to the two units are sealed connections and, after such connections are effected, some means must be employed to sterilize the transfer container. Such sterilizing means commonly constitute steam, sprays of germicidal material or baths or liquid traps containing germicidal liquid. After sterilization, the releasable closure of the two isolators units can be opened and a specimen can be transferred from one unit to the other through the sterilized transfer container.

An alternate method sometimes used, as for the purpose of introducing material, such as food for biological specimens, into an isolator, consists of connecting to the isolator a transfer container with a sealed connection around a releasable closure in the isolator. The attached transfer container is sealed after the content to be introduced into the isolator is placed in the transfer container, following which the interior of the transfer container and the food or other material contained therein is sterilized, whereupon the releasable closure of the isolator can be opened to permit transfer of the content into the isolator unit. Such methods have entailed substantial expense for the equipment required and for the sterilizing equipment, which latter constitutes a high proportion of the cost of the entire system with which such isolators are used.

I have found it is possible to construct isolators for biological and other specimens from synthetic resin sheet material, for example, as illustrated in my above co-pending patent application Ser. No. 656,396, filed May 1, 1957. With the advent of such resin sheet isolators, I have found that procedures become possible for introducing material into and withdrawing material from the isolator without destroying the controlled atmosphere within the isolator which were not possible in all-metal isolators, and it is the primary object of this invention to provide novel and comparatively inexpensive connections between two sealed chambers and methods of making such connections.

A further object of the invention is to provide a connection between two synthetic resin enclosures by placing the same in contact with each other, bonding them together at a limited area of contact, and then severing the bonded areas within the outline thereof to open the interiors of the two enclosures into communication with each other.

A further object of this invention is to provide a method of joining two plastic enclosures together and then separating them while maintaining a controlled environment in one thereof, consisting of arranging them with wall portions thereof in contacting relation and bonding the contacting walls only thereof, severing the bonded walls within the outline of the bond to establish communication between the enclosures and to effect the transfer of contents from one enclosure to another, then effecting a seal of one enclosure interiorly of the communication passage, and then severing the other enclosure exteriorly of such last named seal.

A further object is to provide a joint for two sealed insolator units accommodating transfer of material from one to the other without exposure thereof to atmosphere through an arrangement which also accommodates resealing of one or both of said units after such transfer and prior to separation of the units.

A further object of the invention is to provide an isolator unit having a tubular projection communicating therewith, accessible through manipulation of sealed flexible gloves carried by said isolator unit, said tubular extension being normally sealed and being formed of material capable of bonding with like material in response to the application of heat and pressure, so as to accommodate attachment to said tubular extension of a sealed closure member of like material whose interior can be opened into communication with the interior of the isolator without breaking the sealed condition of either unit by severing the bonded area within the outline thereof.

A further object is to provide a method of joining together two sealed containers formed of heat-sealable or bondable material at contacting walls only of such containers by the application of heat and pressure applied externally of said contacting units and acting through other walls of said respective units which are formed of material incapable of being bonded to said containers by heat and pressure.

Other objects will be apparent from the following specification.

In the drawings:

FIG. 5 is an enlarged longitudinal sectional view taken on line 5—5 of FIG. 6, and illustrating the communication opening between connected units;

FIG. 6 is a transverse sectional view taken on line 6—6 of FIG. 5;

FIG. 7 is a fragmentary view of a unit to be connected with another unit according to my invention, but illustrating a modified embodiment of the invention;

FIG. 8 is a fragmentary sectional view taken on line 8—8 of FIG. 7 and illustrating a step in the modified method of this invention;

FIG. 9 is a fragmentary sectional view illustrating one step of another modification of the process;

FIG. 10 is a fragmentary sectional view similar to FIG. 9 and illustrating one step of still another modification of the process;

FIG. 11 is a fragmentary sectional view illustrating a resealing step of the process shown in FIG. 9;

FIG. 12 is a fragmentary sectional view illustrating an isolator resealed by the step of the process illustrated in FIG. 11; and FIG. 13 is a fragmentary sectional view illustrating an isolator resealed after union thereof with a transfer unit as illustrated in FIG. 10.

Figure 1:
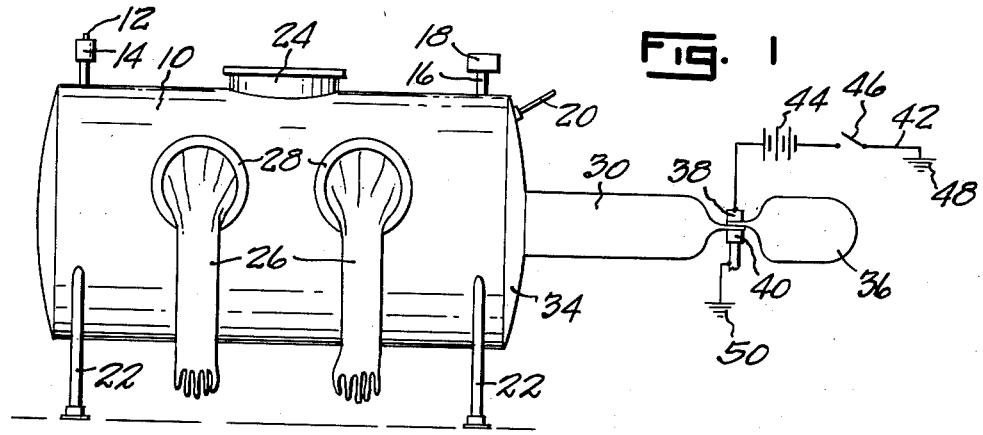
FIG. 1 is a fragmentary view in side elevation illustrating an insolator having a sealed enclosure member attached thereto by the process embodying this invention.

Referring to the drawing, and particularly to FIGS. 1 to 6, inclusive, the numeral 10 designates a container, such as an isolator, within which a predetermined environmental condition is adapted to be maintained, such as a sterile or germ-free environment, or a predetermined contaminated environment. For this purpose suitable air supply means, such as a conduit 12 having a filter 14 therein, may be connected into communication with the chamber, and an outlet 16 having a filter 18 may be provided. Electrical leads 20 may extend through the container to accommodate electrical apparatus within the container. Any suitable means may be provided to support the containers, such as a standard or support 22. The container may be transparent but, if opaque, it may be provided with sight openings spanned by transparent closure mounted in a sight opening frame 24. The container 10 is also provided with means to accommodate access to the interior thereof for manipulation of its contents, for which purpose the container may be provided with elongated sealed flexible gloves 26 mounted in sealed relation at their open ends, as by means of mounting rings 28.

The container 10 may be formed of any suitable material and preferably has a tubular projecting part 30 thereof which is formed of flexible synthetic resin material which is sealed at its outer or free end 32. The opposite or inner end of the sleeve 30 will be bonded or otherwise sealingly united with a wall 34 of the chamber 10 at a position adjacent to and within reach of a worker, so that the worker can thrust his arm into the adjacent glove 26 through the access opening in the container around which the glove is mounted and thence to and into the tubular projection 30. The sleeve may be formed of any of a number of synthetic resin film materials, examples of which are polyethylene film, polyester film, such as polyethylene terephthalate resin, films of vinyl resin, such as films of copolymers of vinyl chloride and vinyl acetate and nylon films. It will be understood that these resin films are recited as illustrative and are not intended to be limiting in that it is possible to fabricate the tube 30 from any type of heat-sealable synthetic resin film or sheet stock.

The unit to be connected with the isolator may constitute a sealed envelope formed of the same material as that of which the sleeve 30 is formed. This envelope 36 will preferably be sterile in the interior thereof in the event the isolator has a sterile interior atmosphere. In the event the isolator 10 has a contaminated interior atmosphere and there is no problem of eliminating any specific types of contamination, the envelope 36 need not be sterile. If, however, the atmosphere of the isolator is contaminated with one or more selected types of contaminating agent only, and all other types of contamination are eliminated, then the condition within the envelope 36 should be similar to that within the isolator.

Figure 2:
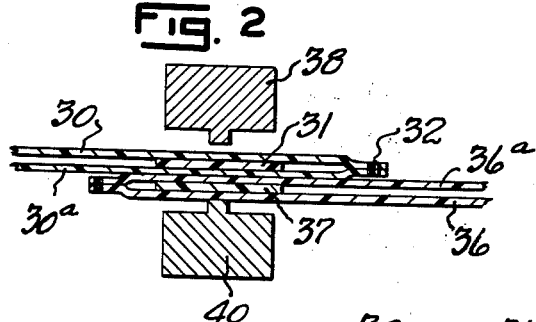
FIG. 2 is an enlarged fragmentary sectional view illustrating a step in the process of this invention.
Figure 3:
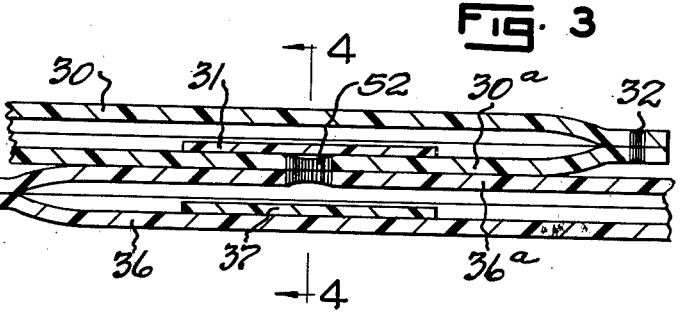
FIG. 3 is a fragmentary sectional view illustrating an intermediate condition produced by the practice of my process.

Assuming that the envelope 36 contains a material to be introduced into the isolator 10 for use in conjunction with experimentation or maintenance or treatment of a specimen contained within the isolator, my method of effecting a connection to permit transfer of this material from the envelope to the isolator while preserving the selected conditions within the isolator, is as follows: The envelope 36 is placed in contact with the sleeve adjacent the sealed end of the sleeve. A dissimilar film material is positioned between the two layers of the sleeve and the two layers of the envelope at the point at which the envelope and the sleeve lap. Such dissimilar material may consist of a sheet 31 of vinyl resin in the sleeve 30 and a sheet 37 of vinyl resin in the envelope 36, in cases where the sleeve 30 and the envelope 36 are formed of a film of polyethylene material, or vice versa. A pair of elongated electrode members 38 and 40, at least one of which has an elongated rib, as the rib 39 of member 38 or the rib 41 of electrode 40, as seen in FIG. 2, are applied to the lapped portions of the sleeve and envelope as shown in FIG. 2, with the rib or ribs engaging the lapped resin part or parts, and are pressed thereagainst at areas with which the sheets 31 and 37 register. One of the electrodes, here shown as the electrode 38, is connected in an electrical circuit 42 which may include a source of current 44 and control switch 46, and which may extend to ground at 48. The other electrode 40 is preferably grounded at 50. The electrodes preferably operate at radio frequency, such as 20 megacycles. Alternatively, one of the members 38 and 40 may comprise a simple heated iron, such as an electric iron, and the other may be a simple pressure applying member which may be heated or at ambient temperature. Assuming that the rib or ribs 39 and 41 are long and narrow and that it or they extend for a length equal to only a part of the width of each of the sleeve 30 and envelope 36, the clamping thereof upon the lapped resin parts to apply heat and pressure will serve to produce a bonded area at 52 between the contacting portions 30a of the sleeve 30 and 36a of the envelope 36. The interposed sheets 31 and 37, being of material dissimilar to the material of which the parts 30 and 36 are formed, serve to prevent bonding thereof, i.e. bonding of the sheets 31 and 37 to the parts 30 and 36. Also, they serve to prevent bonding together of the opposed parts or walls of the units 30 and 36 which are separated by the interposed sheets 31 and 37. Consequently, the parts 30 and 36 are joined together as illustrated in FIG. 3.

Figure 4:
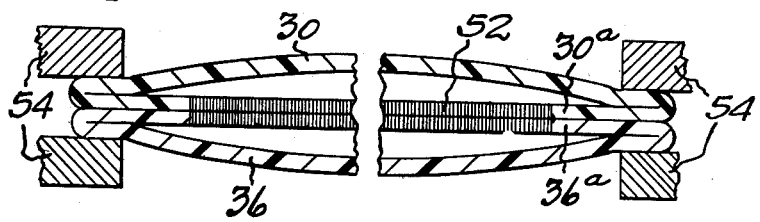
FIG. 4 is a sectional view taken on line 4—4 of FIG. 3.

During the bonding operation, the opposite side margins of the parts 30 and 36 will preferably be clamped by suitable clamping means 54, as best seen in FIG. 4, which preferably extend adjacent to but terminate short of the ends of the bonded areas 52, as best seen in FIG. 4.

After the bond 52 has been made and the parts 38 and 40 are removed, the operator reaches into the member 30 by means of the access glove 26 to manipulate a knife or electric cautery, which will previously have been installed in the unit 10, for the purpose of effecting a cut centrally and longitudinally of the bonded area 52 and transversely of the plane thereof for the major part of the length thereof along the line 53. Alternatively, a pull on the parts bonded at 52 perpendicular to said weakened bond may split the bond transversely without destroying the seal of the bond. Thus members 30 and 36 are opened into communication upon flexing thereof in the fashion illustrated in FIGS. 5 and 6. Thus the user can reach through the member 30 and into the member 36 for the removal of its contents into the unit 10. Alternately, material can be transferred from the unit 10 into the container 36, if desired. In any event, neither part 10 nor 36 is opened to atmosphere, and the environment or atmospheric condition within the unit 10 is not altered detrimentally by communication with the member 36.

After the necessary transfers between the parts 10 and 36 are made, either or both of the members 30 and 36 may be heat-sealed completely thereacross adjacent to the bond 32, as illustrated at dotted lines 56 and 58 in FIG. 5. The seals 56 and 58 again isolate the units 30 and 36 from each other, whereupon the connection between them may be severed as required to condition the unit 10 for subsequent connection with a new member 36 containing additional material to be introduced therein.

It will be apparent that the severing of the member 30 reduces the length thereof progressively in effecting such connection, so that it will ultimately be substantially consumed. When that condition exists, that is, when only a stub of the member 30 remains, a new tube or sleeve section may be joined to said stub using this method, in which case the added section will remain permanently attached. Thereafter, additional units 36 to be connected to the unit 10 will be connected to said unit through the permanently attached extension of the member 30.

In another embodiment as seen in FIGS. 7 and 8, a marginally sealed envelope 60 to be connected to a sleeve 30 formed of the same material is provided with a length of metal foil or wire 62 imbedded in a wall thereof. The imbedded part will preferably be a resistance or heating element adapted for connection in a suitable heating circuit. In this instance a sheet 64 of a resin dissimilar to the resin of which the envelope 60 is formed is contained in the envelope to register with the heating element 62. The member 30 will have the dissimilar sheet 31 interposed between the walls thereof in register with the heating member 62. Abutting walls of the sleeve 30 and envelope 60 are bonded together at and around the imbedded wire 62 in the same manner described above. Then element 62 is electrically energized to melt the plastic thereat to effect an opening at the seal without requiring the use of a knife.

In cases where the member 62 is not a resistance heating element, the free ends of the member 62 project from the envelope to provide means which can be gripped through an opposed wall and pulled upon. The strip 62 serves as a tear strip to form a tear in the bonded area without requiring the user to reach into an enclosure in order to produce a tear or severing to establish communication between enclosures.

Another embodiment of the invention is illustrated in FIGS. 9, 11 and 12. In this construction a synthetic resin sealed specimen-containing chamber similar to the unit 10 is identified by the numeral 70. This unit will preferably have enclosed therein a block or plate 72 which may be shifted from place to place therein as desired. Also, the unit 70 will preferably contain a dispenser for a cement or bonding agent (not shown). A synthetic resin film container 74 of sealed character, which contains material which is to be transferred into the unit 70 or which is to receive material discharged from the container 70 and whose interior atmosphere is compatible with the atmosphere in the interior of the unit 70, has a portion thereof at 76 adhered to a portion of the wall 70 by means of a layer 78 of cement or bonding agent. The synthetic resin forming the container 70 and the container 74 will preferably be the same. It is not essential, however, that the members 70 and 74 be formed of the same material as long as both thereof are compatible with and adapted to be bonded or adhered by the bonding agent or cement 78. A sheet 80 of a plastic material, dissimilar to the material of which the member 74 is formed, is contained within the member 74 and is adapted to be positioned in register with the cemented area 78. The block 72 is then held against the inner face of that wall of the container 70 which registers with the cement 78 and a plate or block 82 is pressed against a part of the wall of the container 74 which is separated from the container wall portion 76 only by the sheet or strip 80. The member 82 will be heated for the purpose of setting the bond of the adhesive agent 78 between the parts 70 and 76.

After the bond 78 has set, the operator may reach into the unit 70 to manipulate a knife or electric cautery therein for the purpose of severing the bond between parts 70 and 76 along the line 81, as seen in FIG. 11, so as to provide an opening through which material may be transferred between the member 70 and the member 74.

When it is desired to reseal the opening 81, a sheet 83 of synthetic resin material is applied against the inner face of the severed wall of the container 70 and a layer of cement or bonding material 84 is employed to adhere the sheet 83 to the inner wall of the member 70 to completely span and close the slit 81 at the inner face thereof. The sheet 80 is reapplied in contact with the wall portion 76 of the container 74, and the plates 72 and 82 are then applied to the laminar arrangement, as illustrated in FIG. 11, with one thereof being heated for the purpose of setting the cement 84. After the bond has been effected, a portion of the wall 76 of container 74 may be severed from the container 74 by cutting around the cement area 78 thereof, thus leaving internal and external patches upon the container 70 as illustrated in FIG. 12.

Subsequent connections of additional containers 74 may be effected in like manner at different points on the container 70 and sealed, as explained above, after transfer of material to or from the same and the chamber 70. Thus as use of the test unit continues, it will progressively acquire adhered patches around the walls thereof until such time as substantially all accessible walls of the container 70 are covered by such patches. When this occurs a second container 70, similar to the one previously in use, will be joined to the previously used container 70 by the same method, and the specimen then transferred into the new container while the other container is discarded. Inasmuch as the synthetic resin film material of which the member 70 is formed permits the member 70 to be comparatively inexpensive, the requirement for disposal of units after a predetermined period of use thereof is not objectionable from a cost standpoint. This method is particularly suitable for use when the containers 70 and 74 are formed of a polyester type of resin, in which case the cement employed to form the bonds at 78 and 84 will be a heat-activated cement.

Another method embodiment is illustrated in FIGS. 10 and 13 which is particularly well suited for use in cases where the specimen container or unit 90 and the sealed transfer unit 92 are both formed of a laminated synthetic resin, and particularly a resin having a polyester film or base 94 and a polyethylene exterior layer or coating 96. In this embodiment a part 98 of the wall of the container 92 is pressed against a part of the wall of the container 90, and a sheet 100 of a synthetic different from the base layer 94 is interposed between opposed walls of the container 92. In a case where the container 92 has a polyester base the film 100 may be of nylon or vinyl. Plates or pressure members 102 and 104 are pressed against the portions of the containers 90 and 92 which register with the sheet 100, and one thereof is heated for the purpose of effecting a heat seal between the external coatings 96 of the containers 90 and 92 to adhere the same. Thereafter, on removal of the members 102 and 104, the operator may reach into the container 90 in the manner explained above for the purpose of severing the bonded walls and providing communication between the containers, as shown at the slit 106. When it is desired to reseal the member 90, a patch 108 is applied over the severed area of the member 90, the same being of a material similar to the member 94 or of a material capable of being heat sealed thereto. Thereupon, the member 102 and 104 are again pressed, this time to effect a bond of the member 108 to the inner surface of the container wall 90 to seal the slit 106. After this bond or seal of the member 108 is effected, the non-adhered portions of the container 92 may be severed around the adhered area, leaving an exposed patch as illustrated in FIG. 13.

In all embodiments of the invention, one of the outstanding advantages is that the method or procedure eliminates the necessity of utilizing sterilizing material adjacent to the animals or within the influence or range of influence of the animals or other specimens contained within the specimen chamber or unit.

While the preferred embodiments of the invention have been illustrated and described, it will be understood that changes in the construction may be made within the scope of the appended claims without departing from the spirit of the invention.

I claim:

1. In combination, a pair of preformed normally sealed enclosures having wall parts formed of flexible synthetic resin film, portions of adjacent resin wall parts of said enclosures being positioned in face contact and bonded together, said bonded wall parts being severed transversely thereof within the area of the bond to provide an opening establishing communication between said enclosures without opening said enclosures to atmosphere.

2. In combination, a pair of preformed enclosures arranged side by side and having wall parts formed of similar flexible heat-sealable synthetic resin, limited areas of said resin walls of said enclosures being arranged in face engagement and united by a heat-sealed bond, the wall of each enclosure registering with said bonded area being free from said bonded area, said bonded wall area being severed transversely thereof within the outline of said bond.

3. In combination, a first preformed enclosure having a flexible wall part and a second preformed enclosure having a flexible wall part, means cementing selected areas of the flexible wall parts of said first and second enclosures, said cemented areas of flexible wall parts being severed transversely thereof to provide an opening therethrough establishing communication between said enclosure, said opening being spaced from the margins of said cemented areas.

4. The method of connecting flexible walls of two preformed imperforate enclosures, consisting of the steps of confronting selected areas of the flexible walls of said enclosures, uniting the confronting areas only of said enclosure walls, and perforating the united walls of said enclosures within the outline and transversely of the united portions thereof to define an imperforate composite enclosure in which said first named enclosures are in communication.

5. The method of connecting together walls of two sealed independent enclosures formed of synthetic resin sheet material capable of being heat sealed, consisting of the steps of positioning selected portions of said enclosure walls in contact, applying heat to bond together the contacting wall portions only of said enclosures while protecting opposite walls of each enclosure against bonding together, and severing the bonded walls transversely and within the outline of said bond to open said enclosures into communication while maintaining said enclosure assembly closed.

6. The method of connecting together parts of the walls of two sealed preformed enclosures formed of synthetic resin sheet material capable of being bonded together by heat, consisting of the steps of positioning selected parts of the walls of said enclosures in contact, interposing between the contacting portions of said enclosure walls and the walls of one enclosure registering therewith a sheet of synthetic resin of a type not capable of bonding to said first synthetic resin by heat, applying heat and pressure to a selected area of said contacting portions to bond together the contacting walls of said enclosures, and severing said contacting walls only transversely thereof and within the outline of the bonded areas thereof to open said enclosures into communication without exposing either to atmosphere.

7. The method of connecting together parts of the walls of two separate enclosures formed of vinyl film, consisting of positioning portions of said vinyl film of said enclosures in contact, positioning a polyester film in at least one enclosure in register with the portion thereof contacting the other enclosure, applying heat and pressure at a selected area of said contacting portions through said polyester film and the two wall portions of the enclosure contacting said polyester film to bond the contacting vinyl walls of said separate enclosures at said area, and transversely severing said bonded walls within the bonded area to establish communication between said enclosures.

8. The method of connecting two sealed independent enclosures having synthetic resin walls at said walls and then disconnecting the same without exposing one thereof to atmosphere, consisting of the steps of arranging selected areas of the resin walls of said independent enclosures in contact, bonding together said contacting wall areas only of said independent enclosures, severing said bonded walls transversely and within the margins of said bond to establish communication between said enclosures without opening either enclosure to atmosphere, then bonding together confronting walls of the same enclosure to provide a seal and barrier between said severed bonded part and the remainder of said one enclosure, and severing said one enclosure between said severed bonded part and said bonded barrier part.

9. The method of connecting two separate enclosures having a synthetic resin wall at a selected area of said resin wall, one enclosure having an electric resistance strip imbedded in a portion of a resin wall thereof with an end projecting therefrom, consisting of the steps of superimposing the strip imbedded portion of one enclosure wall in contact with a resin wall part of the other enclosure, bonding said contacting parts of said enclosures, and energizing said strip to melt said bonded parts and form an opening within the area of said bond and spaced from the margins thereof.

10. The method of connecting two separate enclosures each having polyethylene film walls, consisting of the steps of applying a bonding agent to a selected area of a film wall of one enclosure, superimposing and pressing together parts of said film walls of said enclosures for adhesion by said agent, positioning a vinyl sheet in one enclosure in register with said adhered parts, applying heat and pressure through said vinyl sheet and the two walls of said vinyl-receiving enclosure which are separated by said vinyl sheet to bond said adhered parts, and transversely severing said bonded wall parts of said separate enclosures within the area of said bond.

References Cited in the file of this patent

UNITED STATES PATENTS

| | | |
|---|---|---|
| 2,440,664 | Irons | Apr. 27, 1948 |
| 2,584,632 | Southwick | Feb. 5, 1952 |
| 2,647,681 | Paoli | Aug. 4, 1953 |
| 2,713,017 | Bruns | July 12, 1955 |
| 2,735,797 | Schjeldahl | Feb. 21, 1956 |
| 2,771,724 | Hosier | Nov. 27, 1956 |
| 2,850,422 | Welch | Sept. 2, 1958 |
| 2,885,104 | Greenspan | May 5, 1959 |
| 2,908,601 | Brown | Oct. 13, 1959 |
| 2,916,197 | Detrie et al. | Dec. 8, 1959 |
| 2,916,886 | Robbins | Dec. 15, 1959 |